April 3, 1951 F. G. HEHR 2,547,464

SOUND RECORDING AND REPRODUCING APPARATUS

Filed March 3, 1950

INVENTOR.
Frederick G. Hehr
BY Townsend + Decker
ATTORNEYS

Patented Apr. 3, 1951

2,547,464

UNITED STATES PATENT OFFICE 2,547,464

SOUND RECORDING AND REPRODUCING APPARATUS

Frederick G. Hehr, Santa Monica, Calif.

Application March 3, 1950, Serial No. 147,360

10 Claims. (Cl. 179—1)

This invention has for its principal object the production of a sound recording and reproducing machine or apparatus for voice or music which shall be of simple and compact construction making it readily portable and designed so as to faithfully record and reproduce all sounds substantially within the entire range of frequencies. The invention is applicable particularly to apparatus employing a flexible tape or analogous member containing sound tracks or strips as the recording and reproducing medium.

According to the invention the sounds are divided into a plurality of component bands of frequency ranges, preferably three in number, and separate microphones, amplifiers, recording and reproducing heads, sound tracks and loud speakers are provided as a group for each frequency range, each of the elements in any given group being particularly constructed or designed to respond to its particular range of frequencies while rejecting very strongly or attentuating sounds within other ranges. In this manner a true and faithful tone picture in range and intensity can be successfully recorded and/or reproduced. Obviously, for instance, in the case of an orchestra, it is impossible for an apparatus having a single set of recording and reproducing elements to successfully and simultaneously respond to the vibrations over a wide range of perhaps one hundred instruments each of which exudes a complex pattern of vibrations. Similarly, in the case of voices, with one set of recording and reproducing elements it is impossible to faithfully record and reproduce notes having a radically different pitch and covering a very wide range of frequencies. The invention aims to overcome these difficulties by means of the apparatus about to be described.

In the accompanying drawing illustrating a practical embodiment of the invention:

Figure 1:
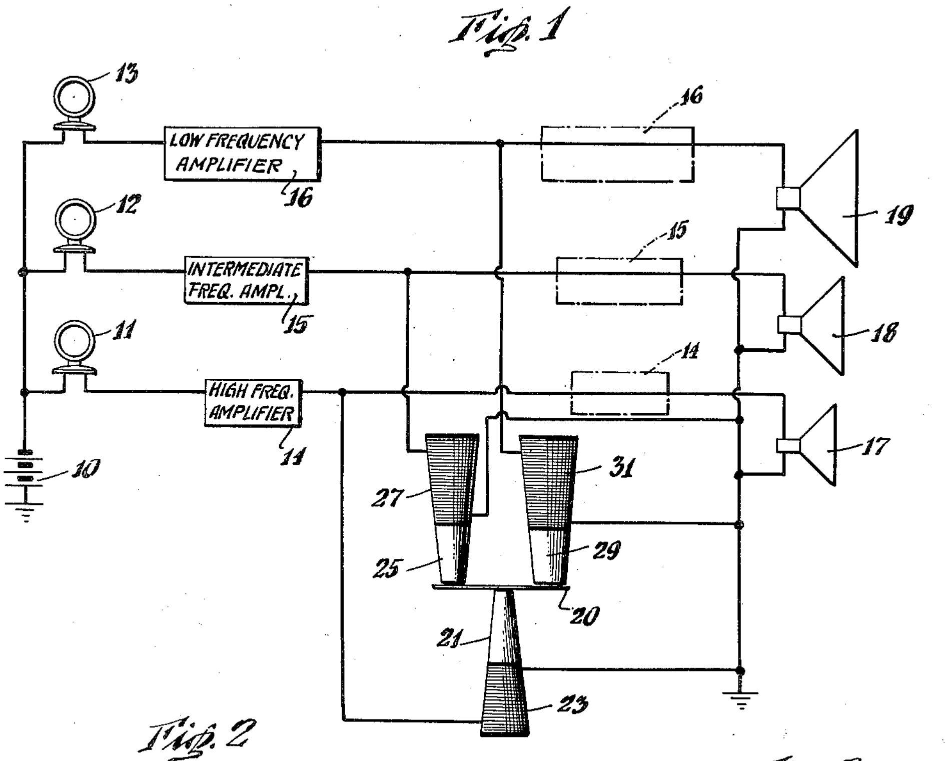
Fig. 1 is a diagrammatic view of the system of the invention.

Referring in detail to the several figures of the drawing:

A source of current is indicated at 10. It is electrically connected to three microphones 11, 12 and 13 respectively each of which is constructed to respond to sounds, either vocal or musical, within a predetermined range and to transform those sounds into electric currents or signals of proper amplitude for its specified range. Microphone 11, for instance, is mainly responsive to sounds or notes within the upper range and it may be of the crystal tape. Microphone 12 is responsive to sounds or notes within the intermediate range and it may be of the dynamic type while microphone 13 is mainly responsive to sounds or notes within the low range and it may be of the large dynamic or ribbon type.

The aforesaid microphones 11, 12 and 13 in turn are electrically connected to amplifiers 14, 15 and 16 respectively each of which contains a filter and other conventional instrumentalities and amplifying equipment so designed and constructed that it will accept, amplify and selectively transmit only frequency components within a predetermined frequency range while rejecting or attentuating others not lying within its specified band of frequencies, for instance, the high frequency amplifier 14 for notes of high pitch such as for tenor or soprano voices or the high notes of musical instruments covers a frequency range of perhaps 7500 to 25,000 cycles per second and will have a power output of perhaps 15 watts. The intermediate frequency amplifier 15 responds to and transmits sounds or notes intermediate high and low ones as, for instance, baritone or alto voices or orchestral notes of intermediate pitch covering a frequency range of from 350 to 10,000 cycles per second and has a power output of from 10 to 15 watts. The low frequency amplifier 16 is responsive to and transmits sounds or notes of low frequency, such as for bass or contralto voices or orchestral notes of low pitch and covers a frequency range of perhaps 15 to 500 cycles per second with a power output approximating 35 watts. Obviously, instead of separate amplifiers, the use of a single amplifier common to all of said microphones and to the loud speakers and the recording and reproducing devices about to be described would not permit of the faithful recording and reproduction of sounds within the entire range of frequencies.

For reproducing purposes each of the aforesaid amplifiers feeds into its individual loud speaker which is designed and constructed to respond particularly to the frequency range of its specific amplifier. Amplifier 14, as shown, is electrically connected to loud speaker 17 of relatively small size for reproduction of sounds or notes of high pitch and it may be the crystal type. Amplifier 15 is electrically connected to loud speaker 18 for reproduction of sounds or notes of intermediate pitch and is larger in size than loud speaker 17. It may be of standard design having a diameter of from 10″ to 12″. Low frequency amplifier 16 is electrically connected to loud speaker 19 for the reproduction of sounds or notes of low pitch and it is still of larger size than loud speaker 18. For best results it has a diameter approximately 16″ and employs a heavy field coil or PM magnet.

In the present apparatus or system it is preferred to employ electro-magnetic recording and reproducing heads of the single pole piece type, one for each amplifier, and they are constructed of magnetically "soft" iron or iron of high permeability. Said heads are preferably identical in construction but differ in size or mass. Each head carries an activating coil connected to its own amplifier and the signal current from the amplifier flows through the activating coil and generates a magnetomotive force in the head that is conveyed to a magnetically "hard" recording medium by said head. When the recording medium is passed through the varying, highly concentrated magnetic field generated by the head, it is left in a state of magnetization corresponding to the strength of the field at the moment a particular element of the recording medium lies within it.

Each recording and reproducing head is responsive to and interprets the range of frequencies within its specific demand and is of a size and construction enabling it to readily respond to the frequency demands of its own particular channel. Said heads are also constructed as to occupy a minimum of space and with that end in view are tapered in configuration with the narow or working face of the heads very slightly spaced from the moving film or tape containing the recording medium. Also, in the interest of the saving of space two of the heads are positioned on one side of the moving film or tape and adjacent each other and the third head on the reverse side of the film or tape and preferably in a position lying centrally of said first two heads and as shown in Fig. 2.

Figure 2:
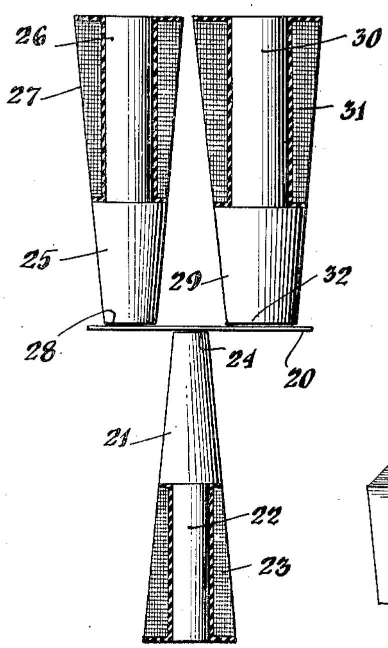
Fig. 2 is a front elevation (partly in section) of the recording and reproducing heads.
Figure 3:
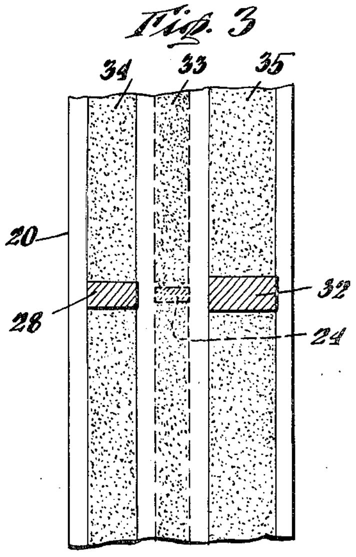
Fig. 3 is a plan view of the recording and reproducing tape containing the sound tracks.

In said Fig. 2 the moving tape or analogous flexible member is indicated at 20. Said tape moves horizontally in the direction of its longitudinal axis and the recording and reproducing heads are stationary and are positioned at right angles to the film. The recording and reproducing head for the high frequency amplifier 14 is indicated at 21. It is tapered, as shown, and terminates at its outer or wide side in a core 22 which may be round in cross-section and receives an activating coil 23 wound thereon which is electrically connected to said amplifier 14. The plane working face of said head 21 at its inner end is indicated at 24 and is rectangular in cross-section as shown in Fig. 3. It is very slightly spaced from the tape 20. The head for the intermediate frequency amplifier 15 is indicated at 25 and is provided with a core 26, activating coil 27 wound on said core and electrically connected to said amplifier and a working face 28 which is slightly spaced from said tape 20. The construction of head 25 for the intermediate frequency amplifier 15 follows that of the head 21 for the high frequency amplifier but the elements thereof are larger in size or mass than those for the head 21 as the magnetomotive force generated in said head must be greater than that in the head 21. The recording and reproducing head for the low frequency amplifier 16 is indicated at 29 and is still of larger size and mass than the other heads for obvious reasons. Its core is indicated at 30, its activating coil at 31 and its working face at 32, said activating coil being in electrical connection with said low frequency amplifier 16.

On the recording side of the apparatus the activating coils of the heads 21, 25 and 29 are connected to the output side of their respective amplifiers 14, 15 and 16 respectively so that each amplifier feeds into its own head and consequently transfers the tones recorded into magnetic waves on its own strip or track of the tape 20. On the reproducing side of the apparatus, however, the coils are connected to the input side of their respective amplifiers and to their respective loud speakers. In the latter case the amplifiers are shown in dotted lines in Fig. 1. Suitable means may be provided for disconnecting the microphones or loud speakers from the system when so desired and suitable switches may be provided for the electrical connections between various of the elements which are manipulated when the apparatus is switched from a recording one to a reproducing one or vice versa.

Figure 4:
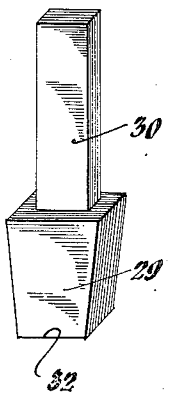
Fig. 4 is a front elevation of a modified form of one of the recording and reproducing heads.

While the recording and reproducing head 21 is shown as being positioned beneath the tape 20 and the other heads 25 and 29 positioned above said tape, that particular arrangement is merely arbitrary and may be varied as long as any two heads are on one side of the tape and the third head on the other side thereof. The arrangement is purely in the interest of the saving of space in order to make the entire apparatus as compact as possible. Also, the positions of the recording and reproducing heads are such that, as shown in Fig. 3, their working faces 24, 28 and 32 have a common horizontal center line at right angles to the longitudinal axis of the tape 20 in order that the synchronization between the sound tracks of the tape may be maintained. Furthermore, in some cases, and as shown in the alternative construction illustrated in Fig. 4, it may be found desirable, in order to prevent current losses from eddy currents and hysteresis, to construct the recording and reproducing heads, including their cores, of thin laminations of metal which are bonded together into one solid unit by means of solder or spelter. The cores, as shown, may also be made rectangular in cross-section instead of round as in the preferred form of the invention.

The tape 20 is somewhat wider than those presently in use and contains three parallel sound tracks or strips 33, 34 and 35 separated from each other and from the sides of the tape and of different widths each corresponding to the length of one of the opposed working faces 24, 28 and 32 respectively of the recording and reproducing heads with which they cooperate in the recording and reproducing operations. These tracks or strips comprise a plastic material which is impregnated with a powdered or finely divided magnetic metal embedded therein, track 33 being positioned on the lower side or face of the tape and tracks 34 and 35 on the upper side thereof whereby they will properly align with and lie adjacent their respective recording and reproducing heads.

In the embodiment of the invention described and to secure good results sound track 35 may be 1/4" wide, sound track 34, 3/16" wide and sound track 33 about 1/8" wide. These figures may vary and are specified primarily to show the relative widths of the tracks with respect to one another. Each track is dimensioned in proportion to the power it is necessary for it to exert to record or reproduce the right frequencies at the proper amplitude. As the magnetic force, figured in Gauss, depends on the mass of magnetic material present, this force must be greatest for the low notes or sounds to attain the amplitude required in the electric currents from which the tones are recreated in the loud speakers. Sound track 35 accordingly is the widest of the three tracks and the other two tracks are more narrow and are proportioned in the same manner to respond to the demands of their particular frequency channels. As is obvious, the construction of the tape described with its parallel and properly dimensioned sound tracks, especially in view of the fact that the working faces 24, 28 and 32 of the recording and reproducing heads have a common horizontal center line transverse to the longitudinal axis of the tape, permits cutting, splicing or editing of the tape without destroying the synchronization between the sound tracks.

As previously explained, the working faces 24, 28 and 32 of the recording and reproducing heads which lie adjacent and cooperate with the sound tracks of the tape 20 are rectangular in cross-section and the length of each working face equals the width of the particular sound track with which the working face cooperates. These lengths, therefore, are $\frac{1}{4}''$, $\frac{3}{16}''$ and $\frac{1}{8}''$ respectively in accordance with the figures previously specified for the widths of the sound tracks. Theoretically, the width or thickness of these rectangular working faces should be small enough so that said faces will not straddle any of the magnetic sinus curves of the record on the sound tracks and thereby avoid a faint or imperfect reproduction. In practice, however, this is not always feasible as it might necessitate making the face too thin for practical purposes. It will be found expedient, therefore, and sufficiently good results will be achieved, if the thickness or width of each working face approximates one-half its length. For the working faces having lengths of $\frac{1}{4}''$, $\frac{3}{16}''$ and $\frac{1}{8}''$, therefore, their thickness or width would approximate $\frac{1}{8}''$, $\frac{3}{32}''$ and $\frac{1}{16}''$ respectively.

Any form of volume controls may be employed for the different sections or channels as adjustment may be required to accentuate one section and attentuate another one because of the different composition of an orchestra, for instance, or because of the acoustics of the room used for reproduction. Also, any conventional eraser head may be employed which will erase all prior impressions on the sound tracks.

The invention claimed is:

1. A sound recording and reproducing apparatus divided into a plurality of bands or channels of different frequency ranges each said band or channel including a separate amplifier and separate magnetic sound recording and reproducing head electrically connected to its amplifier and both responsive only to frequencies within their own and the same predetermined range, a flexible and movable tape, a plurality of sound tracks each of a different width, means whereby each of said sound tracks cooperates with a different head for sound recording and reproducing purposes and each said sound track containing a finely divided material throughout its area and of an amount different from that of another sound track.

2. A sound recording and reproducing apparatus divided into a plurality of bands or channels of different frequency ranges, a separate amplifier and separate magnetic recording and reproducing head for each band or channel, said heads being of different mass and each being electrically connected to its own amplifier, a working face on each head of a length different from that of another working face a movable tape, a plurality of sound tracks on said tape, one for each band or channel of different ranges, each track being filled with a magnetic material, means whereby each of said sound tracks cooperates with the working face of a different head upon movement of said tape for sound recording and reproducing purposes, and the widths each of said sound tracks being different from each other and approximating the length of the working face of its head.

3. A sound recording and reproducing apparatus divided into a plurality of bands or channels of different frequency ranges, a separate amplifier and separate magnetic sound recording and reproducing head for each band or channel, said heads being of different size, a rectangularly-shaped working face on each head each of predetermined length differing from that of the working face of another head, a movable tape, a plurality of sound tracks on said tape, one for each head and each band or channel of frequency ranges, each said sound track being embedded with a magnetic material, means whereby each said sound track cooperates simultaneously with the working face of a different head upon movement of said tape for sound recording and reproducing purposes and the widths of said sound tracks being different from each other and each approximating the length of the working face of its head and the width or thickness of each working face approximating one-half its length.

4. A sound recording and reproducing apparatus divided into three bands or channels, one each for sounds within a predetermined high frequency range, a predetermined intermediate frequency range and a predetermined low frequency range respectively, a separate amplifier and separate magnetic sound recording and reproducing head for each frequency range and responsive only to frequencies within their own and the same range and each head being electrically connected to its own amplifier a movable tape, three parallel sound tracks on said tape, one for each frequency range, said sound tracks being embedded throughout with magnetic material and each track having a width different from that of another track and means whereby said sound tracks cooperate simultaneously with said heads upon movement of said tape for recording and reproducing purposes.

5. A sound recording and reproducing apparatus divided into three bands or channels, one each for sounds within a high frequency range of from 7500 to 25,000 cycles per second, an intermediate frequency range of from 350 to 10,000 cycles per second and a low frequency range of from 15 to 500 cycles per second, an amplifier and a magnetic sound recording and reproducing head for each frequency range, both said amplifier and head for each range being electrically connected together and both being responsive only to frequencies within their own and the same range and each of said heads being of different size and of a size enabling it to readily respond to its own band of frequencies, a movable tape, three sound tracks on said tape, one for each frequency range, said sound tracks being embedded throughout with magnetic material and being of different widths and means whereby said sound tracks cooperate with said heads for recording and reproducing purposes when said tape is moved into operative position adjacent said heads.

6. A sound recording and reproducing apparatus divided into a plurality of bands or channels of different frequency ranges and a separate group of elements for each band or channel comprising a microphone, amplifier, magnetic sound recording and reproducing head and loud speaker, each of said elements in any group being designed and of a size adapting it to be responsive only to its own band of frequencies, each said microphone and loud speaker being electrically connected to the amplifier of its own group each said magnetic head being tapered and flaring outwardly and provided with a core at its outer and widest end carrying an activating coil electrically connected to its own amplifier, a working face on the inner end of each head of an area different from that of the working face of another head and all of said working faces having a common horizontal central axis, a movable tape, parallel sound tracks of different widths on said tape, one for each band or channel, said sound tracks having finely divided magnetic material embedded therein, and means whereby said sound tracks cooperate with the working faces on said magnetic heads for sound recording and reproducing purposes when said tape is moved progressively past said working faces in slightly spaced relation thereto with each of said sound tracks aligning with one of said working faces.

7. A sound recording and reproducing apparatus divided into three bands or channels, one each for sounds within a high frequency range, an intermediate frequency range and a low frequency range and a separate group of elements for each band or channel and comprising a microphone, amplifier, magnetic recording and reproducing head and loud speaker, each said microphone and loud speaker being electrically connected to the amplifier of its own group and each of said elements in any group being designed and of a size to be responsive only to its own band of frequencies, each of said magnetic heads being provided with a core at its outer end carrying an activating coil electrically connected to the amplifier in its group, a working face on the inner end of each magnetic head, all of said working faces having a common horizontal central axis, a movable tape containing three separated and parallel sound tracks each impregnated with finely divided magnetic material and each having a different width corresponding to the length of one of said working faces with one of said sound tracks carried by one side of said tape and the other two sound tracks carried by the other side thereof and said magnetic heads being fixed with each of the working faces thereof aligning with and spanning one of said sound tracks when said tape is moved progressively past the working faces of said magnetic heads for recording and reproducing purposes.

8. A sound recording and reproducing apparatus divided into three bands or channels, one each for sounds within a high frequency range, an intermediate frequency range and a low frequency range and a separate group of elements for each band or channel and including a microphone, amplifier, magnetic recording and reproducing head and loud speaker each electrically connected to the proper element in its group, each of said elements in any group being designed and of a size to be responsive only to its own band of frequencies, a working face on the inner end of each magnetic head, a movable tape, three separated and parallel sound tracks on said tape each said sound track being impregnated with finely divided magnetic material and each having a different width corresponding to the length of one of said working faces and one of said sound tracks being carried by one side of said tape and the other two sound tracks carried by the other side thereof and said magnetic heads being fixed with each of the working faces thereof aligning with and spanning one of said sound tracks when said film or tape is moved progressively past said working faces for recording and reproducing purposes.

9. A sound recording and reproducing apparatus divided into a plurality of bands or channels of different frequency ranges, each said band or channel having a separate amplifier and separate magnetic recording and reproducing head electrically connected to its own amplifier both responsive only to frequencies within their own and the same frequency range, each said magnetic head being of a size different from that of another head, a working portion and a core portion comprising each head and both consisting of a plurality of laminations of soft iron closely bonded together and each said core portion carrying an activating coil electrically connected to its amplifier, a movable tape, parallel sound tracks on said tape, one for each frequency range and head, each said sound track having a width different from that of another track and each containing a finely divided magnetic material throughout its area of a quantity sufficient to satisfy the demands of its own head and of an amount different from that of another sound track and means whereby each of said sound tracks cooperates with the working portion of a different head for sound recording and reproducing purposes upon movement of said tape adjacent said heads.

10. A sound recording and reproducing apparatus divided into three bands or channels of different frequency ranges and including a movable tape, three parallel and separated sound tracks carried by said tape, one for each frequency range, two of said sound tracks being positioned on one side of said tape and the other track on the reverse side of said tape intermediate said first two tracks, each track having a width different from that of the other tracks and all of said tracks being completely embedded with a finely divided magnetic material, three fixed electro-magnetic recording and reproducing heads of the single pole-piece type, one for each frequency range and sound track, with one of said heads positioned in opposed relation to the other heads, working faces at the inner ends of said heads having a common horizontal central axis and each of a length different from that of the others and of a length substantially equal to the width of one of said sound tracks, each said working face registering with and spanning one of said sound tracks when said tape is moved into operative position adjacent said working faces for sound recording and reproducing purposes.

FREDERICK G. HEHR.

REFERENCES CITED

The following references are of record in the file of this patent:

UNITED STATES PATENTS

| Number | Name | Date |
|---|---|---|
| 1,674,683 | Hahnemann | June 26, 1928 |
| 1,711,529 | Hahnemann | May 7, 1929 |
| 1,847,860 | Best | Mar. 1, 1932 |
| 2,213,246 | Heller | Sept. 3, 1940 |
| 2,272,821 | Roys | Feb. 10, 1942 |

FOREIGN PATENTS

| Number | Country | Date |
|---|---|---|
| 468,068 | Great Britain | Jan. 28, 1937 |
| 830,073 | France | July 20, 1938 |